MOSAIC OF SEMICONDUCTOR ELEMENTS INTERCONNECTED IN AN XY MATRIX

Filed March 15, 1966

PRIOR ART

INVENTORS
Marvin A. Schuster, William F. List
and Karl Reinitz
BY
Gordon H. Telfer
ATTORNEY

United States Patent Office 3,448,344

Patented June 3, 1969

3,448,344

MOSAIC OF SEMICONDUCTOR ELEMENTS INTERCONNECTED IN AN XY MATRIX

Marvin A. Schuster, Baltimore, William F. List, Linthicum, and Karl Reinitz, Arnold, Md., assignors to Westinghouse Electric Corporation, Pittsburgh, Pa., a corporation of Pennsylvania Filed Mar. 15, 1966, Ser. No. 534,340
Int. Cl. H02b *1/04*
U.S. Cl. 317—101 4 Claims

ABSTRACT OF THE DISCLOSURE

A mosaic of semiconductor elements is provided disposed in a plurality of columns and rows with each of the columns comprising elements that have a common region of semiconductive material while each of the rows comprises elements having only discrete regions with isolation means between adjacent elements in the rows. A first set of conductive members each contacts the common region of one of said columns and a second set of conductive members contacts all of the elements in each row. The elements may be phototransistors in which case the collector regions of each of the elements in a column are common while the emitter regions of each of the elements in a row are interconnected.

The invention described herein was made in the performance of work under a NASA contract and is subject to the provisions of Section 305 of the National Aeronautics and Space Act of 1958, Public Law 85–568 (72 Stat. 435; 41 U.S.C. 3457).

This application relates to structures providing the functions of a plurality of semiconductor devices and, more particularly, to such structures that include means for interconnecting the elements in an XY matrix.

An XY matrix of interconnections in a two-dimensional array of semiconductor elements provides means for selectively interconnecting one of the individual isolated elements in an external circuit. For example, a monolithic, two-dimensional array or mosaic of phototransistors can be employed for various imaging applications. It is required in such applications that the phototransistors be capable of sequential readout. For this purpose contact is simultaneously made to two regions, the emitter and collector, of an individual element and a readout pulse applied. Separate connections to each emitter and each collector would make fabrication very difficult.

In an XY matrix, all emitters in a row X are interconnected and all collectors in a column Y are interconnected. The individaual rows along which elements are interconnected must be isolated from each other and the individual columns along which elements are interconnected must likewise be isolated from each other; and, of course, all the X interconnections must be isolated from all the Y interconnections. Thus, when a row X and a column Y are pulsed, only element XY at the intersection of that row and column will be readout.

Previously structures have been made comprising a two-dimensional array of phototransistors in an integrated structure where each element is completely isolated from all of the adjacent elements by a diffused region surrounding each element. Rows of elements have their emitters connected by a common conductive member extending across a row of elements. Elements in a column have their collectors connected by conductive members that contact the collectors of each two adjacent elements in a column. The conductive members may be applied as evaporated film and are, of course, insulated from the semiconductor structure where contact is not desired.

Such interconnection schemes have disadvantages due to both their complexity and surface area consumption. The collector interconnections occupy an excessive amount of space and the structure requires isolation area surrounding each element. The excessive space required by this structure limits the resolution (element density) attainable. Additionally, each collector interconnection must cross over an isolation region between every element where the usual diffused isolation walls used between elements. Although insulating means can be provided between the interconnection and the structure, random faults occur which decrease reliability by providing a shorting path between the collector and the isolation wall.

It is, therefore, an object of the present invention to provide an improved two-dimensional mosaic of semiconductor elements interconnected in an XY matrix.

Another object is to provide an improved mosaic of semiconductor elements that employs an interconnection structure that reduces the complexity, decreases the area required for individual elements and improves reliability over that achieved by prior structures.

The present invention achieves the above-mentioned and additional objects and advantages in providing a mosaic of elements disposed in a plurality of columns and rows with each of the columns comprising elements that have a common region of semiconductive material while each of the rows comprises elements having only discrete regions with isolation means therebetween. A first set of conductive members each contacts the common region of one of said columns and a second set of conductive members contacts all of the elements in each row. In the instance in which the elements are phototransistors, the collector regions of each of the elements in a column are common while the emitter regions of each of the elements in a row are interconnected.

Use of this invention has permitted fabrication of monolithic electrooptical mosaics of 2500 phototransistor elements employing semiconductor fabrication techniques such as epitaxial growth and selective diffusion that are thoroughly compatible with existing technology. Such structures have been made as small as one-half inch on each side with an element center-to-center spacing of 10 mils.

The invention, together with the above-mentioned and additional objects and advantages thereof will be better understood by referring to the following description, taken with the accompanying drawing, wherein.

Figure 1:
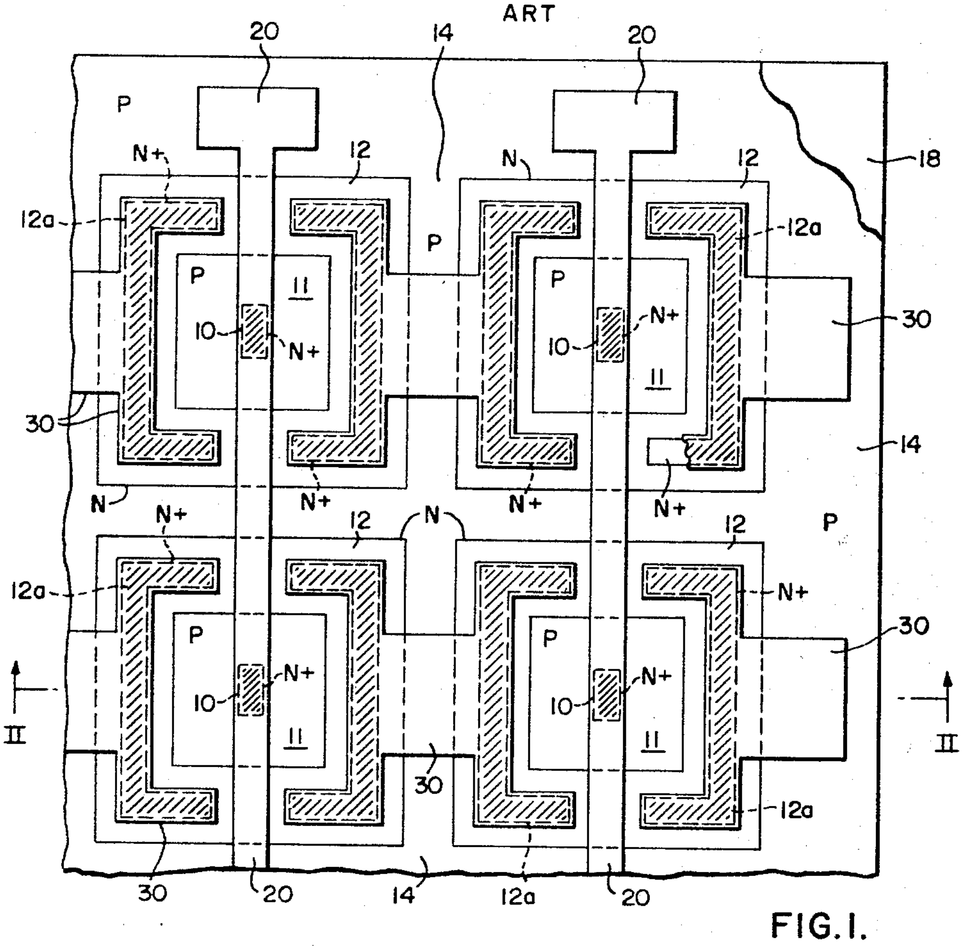
FIG. 1. PRIOR ART
FIGURE 1 is a partial plan view of a mosaic of semiconductor elements in accordance with the prior art.
Figure 2:
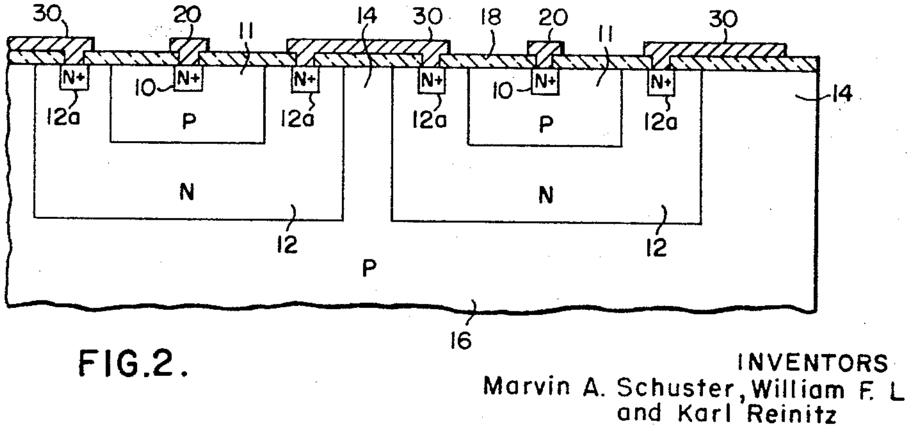
FIG. 2 is a sectional view taken along the line II—II of FIG. 1.

Referring to FIGS. 1 and 2, a mosaic in accordance with the prior art is illustrated wherein a plurality of phototransistors is disposed in a two-dimensional array. Each phototransistor has an emitter region 10, a base region 11 and a collector region 12 that are discrete within each element. In this example the emitters 10 and collectors 12 are of n type conductivity while the base regions 11 are of p type conductivity. Surrounding each element is a diffused isolation wall 14 of p type material extending to a p type substrate 16. The collector region 12 includes a portion 12a at the surface that provides means for making good ohmic contact to the collector that is more highly doped than the major portion of the collector. It will be understood that the semiconductive regions of the structure may be made by known epitaxial growth and selective diffusion techniques.

In order to interconnect each of the emitters of the elements in a single vertical row, such as $X_m$, it is convenient to apply metallization in a strip 20 across the row that contacts the emitter regions 10 and is otherwise isolated from the semiconductive structure by a layer of insulating material 18 such as silicon dioxide. To connect the collector regions 12 of the elements in each of the horizontal columns, such as $Y_n$, a conductor 30 is provided between adjacent elements that contacts the collector contact portions of the adjacent elements and otherwise is insulated from the semiconductor structure. A contact 30 is also disposed on the element at the end of the column. As discussed in the introduction, such structures are excessively complex and area consuming. In addition, it is significantly undesirable to employ the adjacent interconnections 30 that may provide a short between the collector regions 12 and the adjacent isolation wall 14.

Figure 3:
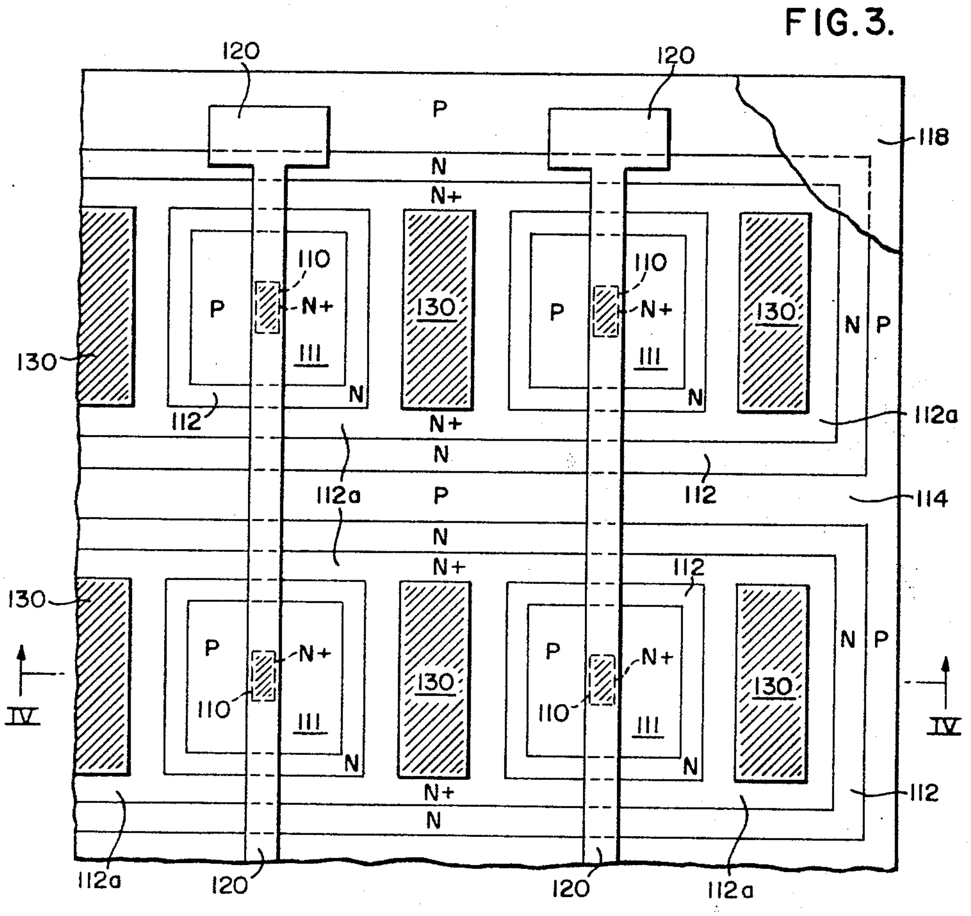
FIG. 3 is a partial plan view of one embodiment of the present invention.
Figure 4:
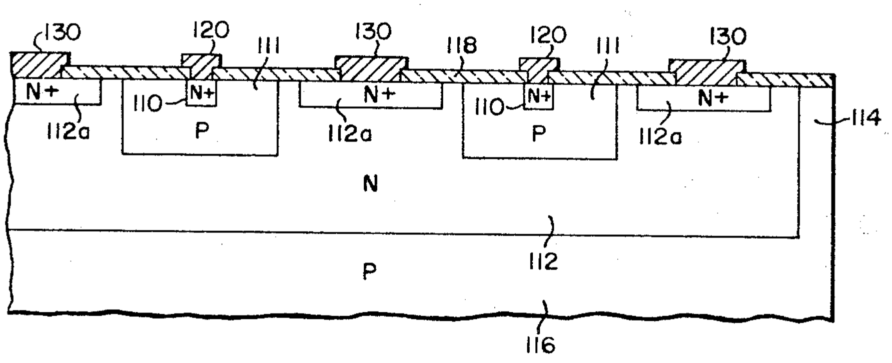
FIG. 4 is a sectional view taken along the line IV—IV of FIG. 3.

FIGS. 3 and 4 illustrate one embodiment of the present invention wherein elements have reference numerals having the same last two digits as the corresponding elements of FIGS. 1 and 2. The isolation wall between elements in a column have been eliminated and the diffused collector contact region **112*a* extends throughout the whole column. Conductors 130** do not crossover any junctions so there is complete assurance of no failures through the metal shorting out an isolation junction at the collector contact. The emitter interconnection is made the same as previously.

Substantial reduction in complexity is achieved principally through the employment of the common collector region 112 of each of the elements in the column and the less required use of conductive material. The conductive material 130 between the adjacent elements in the column is solely to reduce resistivity and its function is not particularly to interconnect the elements.

Figure 5:
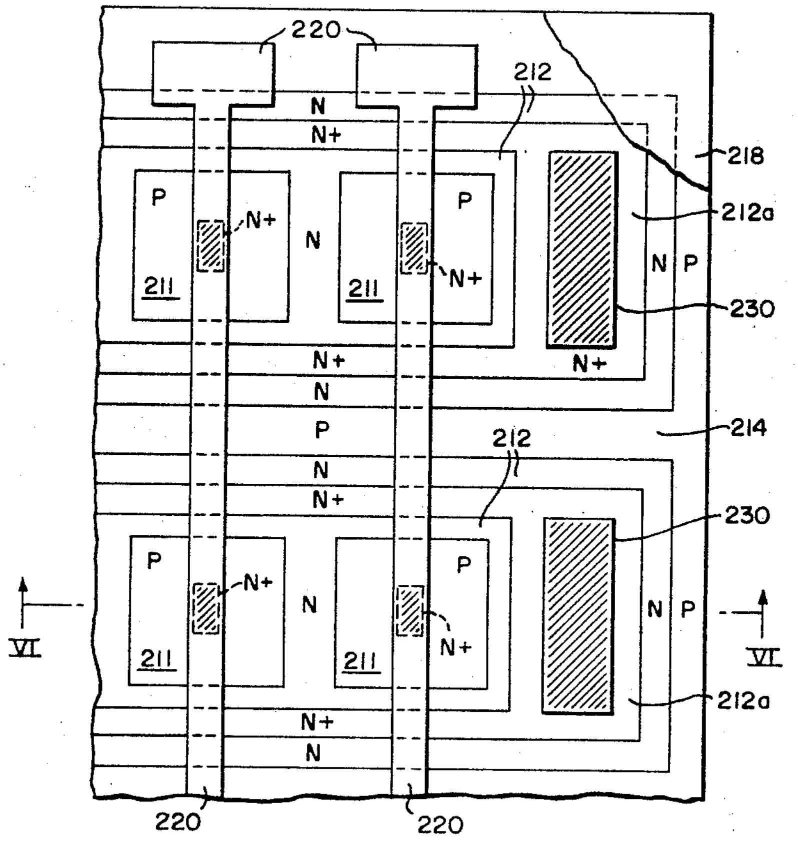
FIG. 5 is a partial plan view of another embodiment of the present invention.
Figure 6:
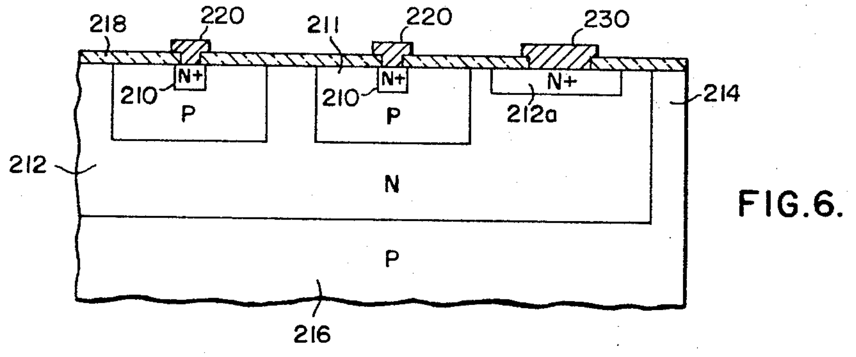
FIG. 6 is a sectional view taken along the line VI—VI of FIG. 5.

FIGS. 5 and 6 illustrate an alternative structure that is substantially like that of FIGS. 3 and 4. In FIGS. 5 and 6 the elements have reference numerals with the same last two digits as the corresponding elements of FIGS. 3 and 4. This structure has no provision of area between adjacent elements for the conductive material previously illustrated. This further reduces the necessary size of the elements and provides simplification. It is suitable if desired to metallize a contact strip within region **212*a* that extends along the column of elements for further reduction in the total resistance of the column. That is, metal may be applied to strip 212*a* except where emitter connectors 220 cross. To save space along a row of elements, the strip 212*a*** may be disposed on only one side of a column of elements.

It is therefore seen that by employing the present invention, it is possible to completely eliminate surface interconnections between adjacent elements in a column and that isolation areas are reduced by 50%. The possibility of collector-isolation shorts is completely eliminated. All the collector regions in a column of elements are interconnected through the semiconductive structure itself. The only isolation areas that are required are between adjacent columns. The structure of this invention achieves greater simplicity and improves reliability while reducing the amount of space required for a given size array of elements. As a result, mosaics may be fabricated with higher yields and greater reliability.

A 2500 device array of elements similar to that of FIGS. 5 and 6 was fabricated and operated successfully. The structure was formed by using a starting material 216 of about 10 ohm-centimeter p type silicon on which an epitaxial layer 212 of one ohm-centimeter n type silicon having a thickness of about 20 microns was grown. A diffusion for the isolation wall 214 was performed using an acceptor impurity to a sheet resistivity of about 5 ohms per square.

Base regions 211 were formed by diffusion of an acceptor impurity to a sheet resistivity of about 165 ohms per square and a thickness of about 3 microns. The base regions were about 6 by 6 mils in size.

The diffusion for emitters 210 and collector contacts **212*a* was performed simultaneously using an n type impurity to a sheet resistance of about 2 ohms per square and a thickness of about 2 microns. In this array, the resistance of a row of emitter elements was about 100 ohms while that of a column of collectors was from about 500 to 1500 ohms without any metallization between adjacent elements. Metallization of a contact strip within 212*a*** would substantially further reduce such resistance.

It will be understood that relatively large area pads are required at the ends of the rows and elements to accommodate external bonded connections. The pad may be disposed atop the insulating material that is provided and may or may not be separated from the other portions of the structure by another isolation wall.

Among the many variations in structure that may be employed in the practice of this invention are to use a diffused n+ type region in discrete columns in the substrate surface prior to epitaxial growth of the n layer. The diffused n+ regions would be common within each column of elements and would further assist in reduction of resistance while permitting a thinner epitaxial layer. Furthermore, the surface n+ regions, such as **212*a***, may extend through the epitaxial layer to meet such a subdiffused region.

Additionally, it will be appreciated that the isolation means between adjacent columns may be other than as shown and may, for example, include a dielectric material for isolation by any of various known techniques.

The individual elements themselves need not, of course, be phototransistors. The interconnection scheme in accordance with this invention is likewise applicable to arrays of other elements such as diodes in a logic matrix. In general, the interconnection scheme may be applied to any integrated circuit of an array of elements wherein interconnections between like regions of adjacent elements are desired.

While the invention has been shown and described in a few forms only it will be understood that various changes and modifications may be made without departing from the spirit and scope thereof.

What is claimed is:

1. A two-dimensional mosaic of semiconductor elements interconnected in an XY matrix comprising: a plurality of semiconductor elements integrated in a unitary structure and disposed in a plurality of columns and a plurality of rows transverse to said columns, each of said columns comprising elements that have a common region of semiconductive material, each of said rows comprising elements that have only discrete regions separated by isolation means between adjacent columns of said elements; first conductive means comprising a plurality of isolated conductive members each contacting said common region in one of said columns; second conductive means comprising a plurality of isolated second conductive members each contacting a plurality of like semiconductive regions in one of said rows, said first and second conductive means being separate.

2. The combination as defined in claim 1 wherein: each of said elements is a phototransistor in which said common region in said columns are collector regions and said interconnected plurality of like regions in said rows are emitter regions.

3. The combination as defined in claim 1 wherein: said plurality of conductive members of said first conductive means are each disposed only at an extremity of each of said columns.

4. The combination as defined in claim 1 wherein: said plurality of conductive members of said first conductive means include a member disposed at an extremity of each of said columns and also members disposed between adjacent pairs of elements in said columns with none of said member crossing over a p-n junction.

References Cited

UNITED STATES PATENTS

| | | | |
|---|---|---|---|
| 3,028,366 | 4/1962 | Lehovec | 317—235 |
| 3,117,260 | 1/1964 | Noyce | 317—235 |
| 3,312,882 | 4/1967 | Pollock | 317—235 |
| 3,335,340 | 8/1967 | Barson et al. | 317—235 |

JAMES D. KALLAM, *Primary Examiner*.

U.S. Cl. X.R.

317—234; 29—569